(12) United States Patent
Liu et al.

(10) Patent No.: US 10,156,923 B2
(45) Date of Patent: Dec. 18, 2018

(54) IN-CELL TOUCH DISPLAY PANEL, DRIVING METHOD THEREOF AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN)

(73) Assignees: BOE TECHNOLOGY GROUP., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 209 days.

(21) Appl. No.: 14/436,673

(22) PCT Filed: Sep. 2, 2014

(86) PCT No.: PCT/CN2014/085766
§ 371 (c)(1),
(2) Date: Apr. 17, 2015

(87) PCT Pub. No.: WO2015/180283
PCT Pub. Date: Dec. 3, 2015

(65) Prior Publication Data
US 2016/0274712 A1    Sep. 22, 2016

(30) Foreign Application Priority Data
May 30, 2014    (CN) .......................... 2014 1 0240394

(51) Int. Cl.
*G06F 3/041*    (2006.01)
*G06F 3/044*    (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ........ G06F 3/046; G06F 3/0412; G06F 3/044; G06F 3/045; G06F 2203/04103; G06F 2203/04112; G02F 1/13338
See application file for complete search history.

(56) References Cited

U.S. PATENT DOCUMENTS

2010/0028811 A1*  2/2010  Geaghan ................. G06F 3/044
                                                        430/319
2013/0057511 A1*  3/2013  Shepelev ................ G06F 3/044
                                                        345/174
(Continued)

FOREIGN PATENT DOCUMENTS

CN    102841716 A    12/2012
CN    102937853 A    2/2013
(Continued)

OTHER PUBLICATIONS

International Search Report Appln. No. PCT/CN2014/085766; dated Feb. 4, 2015.
(Continued)

*Primary Examiner* — Robert J Michaud
(74) *Attorney, Agent, or Firm* — Ladas & Parry LLP

(57) ABSTRACT

An in-cell touch display panel, a driving method thereof and a display device are provided. The display panel includes a common electrode layer and a plurality of touch sensing electrodes. The common electrode layer comprises a plural-
(Continued)

ity of first touch driving electrodes and a plurality of second touch driving electrodes that are configured for loading of common electrode signals in a display period and for loading of touch signals in a touch period. The second touch driving electrodes include a plurality of second touch driving sub-electrodes. Projections of the touch sensing electrodes on an array substrate are at gaps of the second touch driving sub-electrodes that are adjacent within the second touch driving electrodes. With this display panel, the touch sensitivity can be enhanced.

19 Claims, 2 Drawing Sheets

(51) Int. Cl.
*G02F 1/1333* (2006.01)
*G02F 1/1335* (2006.01)
(52) U.S. Cl.
CPC ...... *G06F 3/0412* (2013.01); *G02F 1/133512* (2013.01); *G06F 2203/04103* (2013.01); *G06F 2203/04111* (2013.01)

(56) References Cited

U.S. PATENT DOCUMENTS

| | | | | |
|---|---|---|---|---|
| 2014/0022210 A1* | 1/2014 | Wu | ................... | G02F 1/13338 345/174 |
| 2014/0028616 A1 | 1/2014 | Furutani et al. | | |
| 2014/0055685 A1 | 2/2014 | Wang et al. | | |
| 2014/0063368 A1* | 3/2014 | Yamazaki | ........... | G02F 1/13338 349/12 |
| 2014/0111476 A1 | 4/2014 | You et al. | | |
| 2014/0111710 A1 | 4/2014 | Yang et al. | | |
| 2014/0118299 A1 | 5/2014 | Wang et al. | | |
| 2014/0204284 A1* | 7/2014 | Yao | ........................ | G06F 3/044 349/12 |
| 2014/0333574 A1* | 11/2014 | Xi | .......................... | G06F 3/046 345/174 |
| 2016/0188029 A1 | 6/2016 | Liu et al. | | |

FOREIGN PATENT DOCUMENTS

| | | |
|---|---|---|
| CN | 102955636 A | 3/2013 |
| CN | 202838292 U | 3/2013 |
| CN | 103218097 A | 7/2013 |
| CN | 103293737 A | 9/2013 |
| CN | 103995617 A | 8/2014 |
| CN | 204009802 U | 12/2014 |

OTHER PUBLICATIONS

Written Opinion of the International Searching Authority Appln. No. PCT/CN2014/085766; dated Feb. 4, 2015.
First Chinese Office Action dated Jun. 2, 2016; Appln. No. 201410240394.8.
Second Chinese Office Action dated Nov. 2, 2016; Appln. No. 201410240394.8.

* cited by examiner

IN-CELL TOUCH DISPLAY PANEL, DRIVING METHOD THEREOF AND DISPLAY DEVICE

TECHNICAL FIELD

At least one embodiment of the present invention relates to an in-cell touch display panel, a driving method thereof and a display device.

BACKGROUND

Touch display panels have been widely applied in television sets, cell phones, portable terminals and other display devices. In terms of an in-cell touch display panel with touch electrodes embedded inside the display panel, not only the overall thickness of the module can be decreased, but also the production costs of the touch display panel can be reduced, and thus it has attracted the attention of the major manufactures.

FIG. 1 is a schematically plan view illustrating an in-cell touch display panel, and FIG. 2 is a sectional view taken along line A-A in FIG. 1. As shown in FIG. 2, the in-cell touch display panel comprises an array substrate 10 and a color filter substrate 20 disposed opposite to the array substrate 10. A plurality of touch sensing electrodes 21 are provided on the color filter substrate 20, and a common electrode layer 11 comprising a plurality of touch driving electrodes 12 and a plurality of common electrodes 13, which are disposed across each other in an insulating manner, is provided on the array substrate 10. As can be seen from the plan view in FIG. 1, each of the touch driving electrodes 12 comprises a plurality of touch driving sub-electrodes Tx that are electrically connected by a touch driving signal line 14 extending along a first direction X (such as, the extending direction of a data line on the array substrate); each common electrode 13 is a strip-like electrode extending along a second direction Y (such as, the extending direction of a gate line on the array substrate) perpendicular to the first direction X, and located between two adjacent touch driving sub-electrodes Tx; a plurality of touch sensing electrodes 21 extend along the second direction Y, and correspond to the location of a black matrix (not shown), so as to not affect the aperture ratio of the display panel. At the display stage, common electrode signals are applied to the common electrodes 13 and the touch driving electrodes 12 simultaneously; at a touch stage, a touch scanning signal is applied to touch driving electrodes 12 while a common electrode signal is applied to common electrodes 13.

SUMMARY

According to at least one embodiment of the present invention, there are provided an in-cell touch display panel, a driving method thereof and a display device, so as to increase mutual capacitances between touch sensing electrodes and touch driving electrodes, and to enhance the touch sensitivity of the touch display panel.

According to at least one embodiment of the invention, there is provided an in-cell touch display panel, which comprises a common electrode layer on an array substrate; the common electrode layer comprises a plurality of first touch driving electrodes and a plurality of second touch driving electrodes that are disposed alternately in an insulating manner, and the second touch driving electrodes comprise a plurality of second touch driving sub-electrodes arranged side by side; the first touch driving electrodes and the second touch driving electrodes are configured for loading of common electrode signals in a display period, and for loading of touch signals in a touch period; the touch display panel further comprises a plurality of touch sensing electrodes, projections of which on the array substrate lie at gaps of the second touch driving sub-electrodes that are adjacent within the second touch driving electrodes.

According to at least one embodiment of the invention, there is further provided a driving method of the above in-cell touch display panel. In this method, in a display period, common electrode signals are applied to first touch driving electrodes and second touch driving electrodes; in a touch period, touch scanning signals are applied to the first touch driving electrodes and the second touch driving electrodes.

According to at least one embodiment of the invention, there is further provided a display device, comprising the above in-cell touch display panel.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Figure 1:
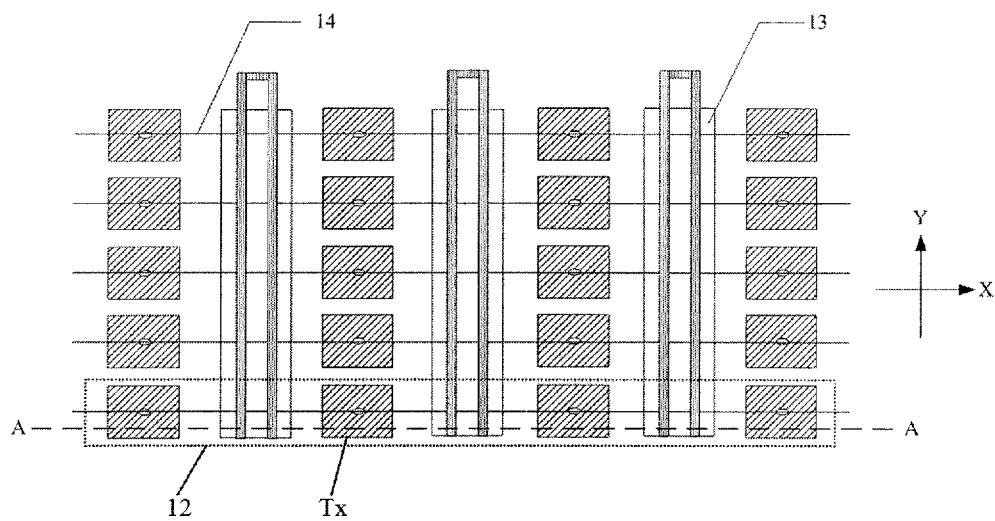
FIG. 1 is a schematically plan view illustrating an in-cell touch display panel.
Figure 2:
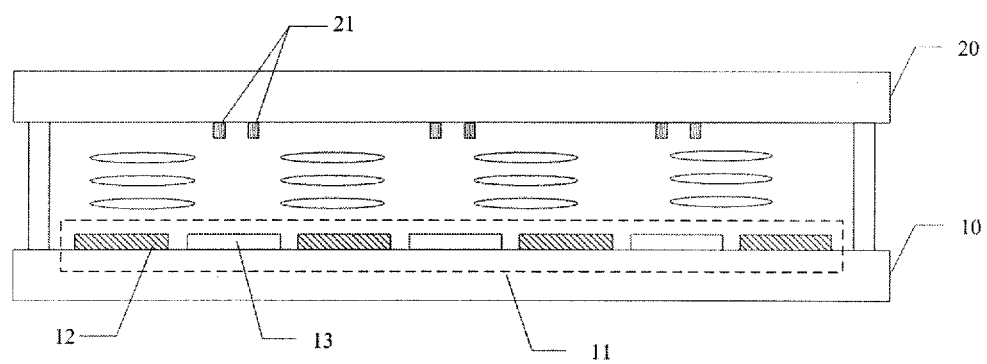
FIG. 2 is a sectional view taken along line A-A in FIG. 1.

As noticed by inventors of the present application, in an in-cell touch display panel shown in FIG. 1 and FIG. 2, the mutual capacitance between a touch driving electrode and a touch sensing electrode is relatively smaller, and the touch sensitivity is not high.

Figure 3:
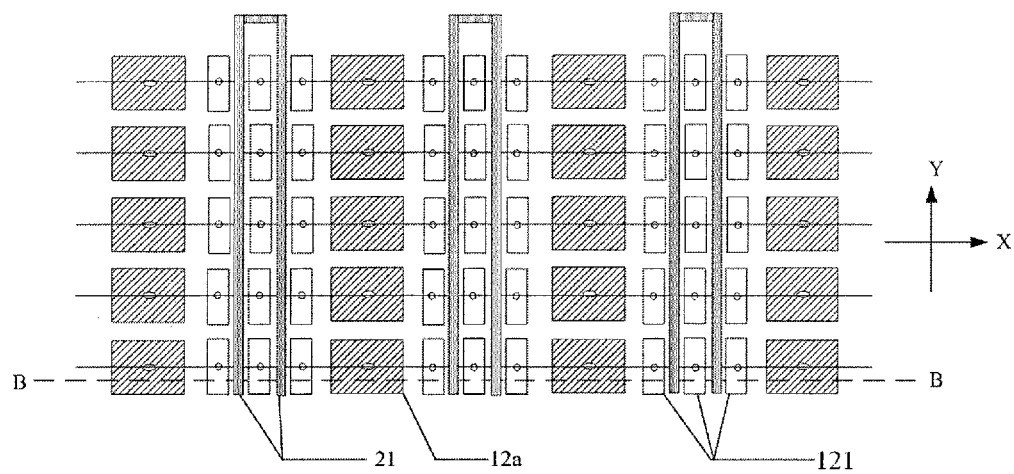
FIG. 3 is a schematically plan view illustrating an in-cell touch display panel according to an embodiment of the invention.
Figure 4:
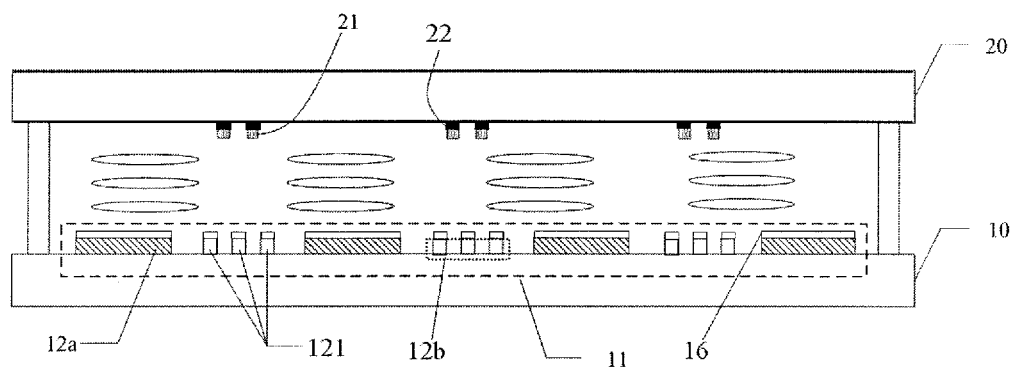
FIG. 4 is a sectional view taken along line B-B in FIG. 3.

FIG. 3 is a schematically plan view illustrating an in-cell touch display panel according to an embodiment of the invention; FIG. 4 is a sectional view taken along line B-B in FIG. 3. As shown in FIG. 4, the in-cell touch display panel according to at least one embodiment of the invention comprises an array substrate 10 comprises a common electrode layer 11. The common electrode layer comprises a plurality of first touch driving electrodes 12a and a plurality of second touch driving electrodes 12b, which are disposed alternately in an insulating manner, and the second touch driving electrodes 12b comprises a plurality of second touch sub-electrodes 121 that are arranged side by side. For example, the second touch sub-electrodes 121 are the same in shape and size. The touch display panel further comprises a plurality of touch sensing electrodes 21, and the projection of a touch sensing electrode 21 on the array substrate 10 lies at a gap between adjacent second touch driving sub-electrodes 121 within a second touch driving electrode 12b. Common electrodes 13 in an in-cell touch display panel as shown in FIG. 1 and FIG. 2 also function as touch driving electrodes in the in-cell touch display panel according to embodiments of the invention. At the display stage, common electrode signals are applied to first touch driving electrodes 12a and the second touch driving electrodes 12b so as to realize a display function; at the touch stage, touch signals are applied to the first touch driving electrodes 12a and the second touch driving electrodes 12b so as to achieve a touch control function. Because the area of a touch driving electrode is increased in this arrangement, and the distance between a touch driving electrode and a touch sensing electrode becomes closer, the fringing mutual capacitance is raised, and the touch sensitivity is promoted. FIG. 4 merely exemplarily illustrates embodiments of the invention, but is not in any way limitative of the invention. It should be understood by those skilled in the art that, touch sensing electrodes are not necessarily provided on a color filter substrate, and may also be provided on an array substrate, as long as they do not contact touch driving electrodes.

In one embodiment, in order not to affect the aperture ratio of the display panel, touch sensing electrodes 21 are arranged to correspond to the position of a black matrix 22 of the color filter substrate, as shown in FIG. 4. Because the projection of a touch sensing electrode 21 on the array substrate 10 lies at a gap between adjacent second touch driving sub-electrodes 121, the position of the gap corresponds to the position of the black matrix 22. It is to be noted that, the black matrix in the place corresponding to the touch sensing electrode and the gap is merely exemplarily shown in FIG. 4, but embodiments of the invention are not limited thereto. It should be understood by those skilled in the art that, the black matrix is also located at the other location between R, G, and B pixels.

The pattern of touch driving electrodes of the in-cell touch panel according to an embodiment of the invention can be seen more clearly from FIG. 3. As shown in FIG. 3, touch sensing electrodes 21 extend along a second direction Y perpendicular to a first direction X. In one embodiment, the first direction X is in accordance with the extending direction of data lines on an array substrate, and the second direction Y is in accordance with the extending direction of gate lines on the array substrate. In one embodiment, the first touch driving electrodes 12a and the second touch driving electrodes 12b are electrically connected together by touch driving signal lines 14 in the first direction X. In one embodiment, a plurality of first touch driving electrodes 12a are arranged side by side, and each of the first touch driving electrodes 12a is the same in shape and size. In one embodiment, a plurality of second touch driving electrodes 12b are likewise arranged side by side, and are aligned with the first touch driving electrodes 12a in the first direction X, and each of the second touch driving electrodes 12b is the same in the shape and size.

In various embodiments, the length or wide of each of the first touch driving electrodes 12a may be in the range from 4 mm to 6 mm. In various embodiments, the length or width of each of the second touch driving electrodes 12b may also be in the range from 4 mm to 6 mm, and for example, its shape and size are the same as those of a first touch driving electrode 12a. For example, the shape of the first touch driving electrodes is a square or a rectangle. In various embodiments, along the second direction Y, the spacing between two adjacent first touch driving electrodes 12a and/or two adjacent second touch driving electrodes 12b is in the range from 4 μm to 8 μm, and this spacing corresponds to the position of a black matrix 22 of the color filter substrate 20, so that the display effect can be avoided from being affected. Each of the touch sensing electrodes 21 extend along a second direction Y perpendicular to a first direction X, so that a second touch driving electrode 12b is divided into a plurality of second touch driving sub-electrodes 121, and the spacing between second touch driving sub-electrodes 121 within a second touch driving electrode 12b corresponds to the line width of a touch sensing electrode 21.

In one embodiment, the first touch driving electrodes 12a and the second touch driving electrodes 12b also have an electrode protective layer 16 provided thereon, and the electrode protective layer 16 may be produced in the same layer as a pixel electrode layer, but is not connected to the pixel electrode layer. Because the pixel electrode layer is generally formed of ITO, IGZO or other material, provision of the electrode protective layer on the first and second touch driving electrodes 12a, 12b can prevent touch driving electrodes from being oxidized. In this way, the process stability becomes better, and the resistance is reduced to a certain extent as well. As understandable by those skilled in the art, it is possible that while a pixel electrode layer is formed, the pixel electrode layer is formed on other electrode layer or pad to function as a protective layer. For example, a pixel electrode layer is formed on pads in a marginal area to function as a protective layer. Thus, the resistance of electrodes or pads can be reduced while the electrodes or pads are prevented from being oxidized.

In FIG. 3, first touch driving electrodes 12a and second touch driving electrodes 12b in the same row are electrically connected by at least one touch driving signal line 14 in the direction X. In one embodiment, the touch driving signal lines 14 are produced in the same layer as the first touch driving electrodes 12a and the second touch driving electrodes 12b, and act to connect the first touch driving electrodes and the second touch driving electrodes that are adjacent, and the touch driving signal lines 14 and the touch sensing electrodes 21 are disposed in a manner of insulating each other. For example, it is possible that a via hole is provided at a location of a touch driving signal line 14 over a touch sensing electrode 21, and through the via hole, a corresponding metal layer underlying the touch sensing electrode 21 is connected to the touch driving signal line 14 to connect the first touch driving electrodes and the second touch driving electrodes that are adjacent to each other. In this way, not only the process steps can be decreases, but also it is helpful to narrow a frame of the touch panel. It should be understood by those skilled in the art that, the touch driving signal line is not limited to one in number, and there may be the case where first touch driving electrodes and second touch driving electrodes in the same row are electrically connected by a plurality of touch driving signal lines 14.

According to at least one embodiment of the invention, there is further provided a driving method of an in-cell touch display panel. The driving method is applicable to the touch display panel as stated above. In this method, the time period for display of each frame of image of the touch display panel can be divided into a display period and a touch period. In this case, the method may comprise that, in the display period, common electrode signals are applied to the first touch driving electrodes 12a and the second touch driving electrodes 12*b* at the same time; in the touch period, touch scanning signals are applied to the first touch driving electrodes 12*a* and the second touch driving electrodes 12*b* at the same time. A common electrode signal may be always applied to touch sensing electrodes of the touch display panel, the effective mutual capacitance formed in this way is an electrical field part formed at fringes of touch sensing electrodes and touch driving electrodes. In the touch display panel according to embodiments of the invention, the common electrode portions shown in FIG. 1 and FIG. 2 also function as touch driving electrodes, and therefore, this increases the marginal electric field greatly, and enhances the touch sensitivity.

In one embodiment, the driving method of the in-cell touch display panel may further comprise that, in the display period, gate scanning signals are applied to gate signal lines in the display panel, and gray-scale signals are applied to data lines; in the touch period, no signal is input into each of the gate signal lines and the data signal lines in the display panel.

According to at least one embodiment of the invention, there is further provided a display device, comprising the in-cell touch display panel as stated above. The display device may be a cell phone, a tablet computer, a television, a display, a notebook computer, a digital photo frame, a navigator or any other product or component having a display function.

According to embodiments of the invention, by using common electrodes as shown in FIG. 1 and FIG. 2 as touch driving electrodes, mutual capacitances between touch sensing electrodes and touch driving electrodes are increased, and thus, the touch sensitivity is enhanced, and a good touch experience is provided to a user.

Although embodiments of the present invention have been described in conjunction with drawings, various modifications and variants can be made by those skilled in the art without departing from the spirit and scope of the invention. Such modifications and variants each fall within the scope defined by attached claims.

This application claims the benefit of priority from Chinese patent application No. 201410240394.8, filed on May 30, 2014, the disclosure of which is incorporated herein in its entirety by reference as a part of the present application.

What is claimed is:

1. An in-cell touch display panel, comprising:
   an array substrate and a color filter substrate;
   a common electrode layer on the array substrate, wherein the common electrode layer comprises a plurality of first touch driving electrodes and a plurality of second touch driving electrodes that are disposed alternately in an insulating manner, the second touch driving electrodes comprise a plurality of second touch driving sub-electrodes arranged side by side; the first touch driving electrodes and the second touch driving electrodes are configured for loading of common electrode signals in a display period, and for loading of touch signals in a touch period; and
   a plurality of touch sensing electrodes, wherein the plurality of touch sensing electrodes is disposed on the color filter substrate, the second touch driving sub-electrodes are disposed on the array substrate, and each projection of the plurality of touch sensing electrodes projects toward a gap of the second touch driving sub-electrodes in the common electrode layer.

2. The in-cell touch display panel claimed as claim 1, wherein gaps of the second touch driving sub-electrodes correspond to a position of a black matrix on a color filter substrate of the display panel.

3. The in-cell touch display panel claimed as claim 1, wherein the touch sensing electrodes extend along a second direction perpendicular to a first direction, the first direction is an extending direction of data lines on an array substrate, and the second direction is an extending direction of gate lines on the array substrate.

4. The in-cell touch display panel claimed as claim 1, further comprising an electrode protective layer disposed on the first touch driving electrodes and the second touch driving electrodes,
   wherein the electrode protective layer is produced in a same layer as a pixel electrode layer of the array substrate, and is not connected to the pixel electrode layer.

5. A driving method of an in-cell touch display panel, wherein the in-cell touch display panel is the in-cell touch display panel claimed as claim 1;
   the method comprises:
   in a display period, applying common electrode signals to first touch driving electrodes and second touch driving electrodes, and
   in a touch period, applying touch scanning signals to the first touch driving electrodes and the second touch driving electrodes.

6. A display device comprising the in-cell touch display panel claimed as claim 1.

7. The in-cell touch display panel claimed as claim 2, wherein along a first direction, the plurality of the first touch driving electrodes and the plurality of the second touch driving electrodes are electrically connected by at least one touch driving signal line in the first direction.

8. The in-cell touch display panel claimed as claim 2, wherein the touch sensing electrodes extend along a second direction perpendicular to a first direction, the first direction is an extending direction of data lines on an array substrate, and the second direction is an extending direction of gate lines on the array substrate.

9. The in-cell touch display panel claimed as claim 2, further comprising an electrode protective layer disposed on the first touch driving electrodes and the second touch driving electrodes,
   wherein the electrode protective layer is produced in a same layer as a pixel electrode layer of the array substrate, and is not connected to the pixel electrode layer.

10. The in-cell touch display panel claimed as claim 7, wherein the plurality of the first touch driving electrodes are arranged side by side, and the plurality of the first touch driving electrodes have the same shape and size.

11. The in-cell touch display panel claimed as claim 7, wherein a length or width of each of the first touch driving electrodes is in the range from 4 mm to 6 mm.

12. The in-cell touch display panel claimed as claim 7, wherein along a second direction perpendicular to the first direction, and a spacing between two of the first touch driving electrodes that are adjacent is in the range from 4 μm to 8 μm, and corresponds to a position of the black matrix of the color filter substrate.

13. The in-cell touch display panel claimed as claim 7, wherein the second touch driving electrodes are arranged side by side, and aligned with the first touch driving electrodes in the first direction, and the second touch driving electrodes are the same in shape and size.

14. The in-cell touch display panel claimed as claim 7, wherein a length or width of each of the second touch driving electrodes is in the range from 4 mm to 6 mm.

15. The in-cell touch display panel claimed as claim 7, wherein along a second direction perpendicular to the first direction, and a spacing between two of the second touch driving electrodes that are adjacent is in the range from 4 µm to 8 µm, and corresponds to position of the black matrix of the color filter substrate.

16. The in-cell touch display panel claimed as claim 7, wherein along the first direction, the first touch driving electrodes and the second touch driving electrodes in a same row are electrically connected by at least one touch driving signal line.

17. The in-cell touch display panel claimed as claim 7, wherein the touch driving signal line is produced in a same layer as the first touch driving electrodes and the second touch driving electrodes.

18. The in-cell touch display panel claimed as claim 7, wherein the touch sensing electrodes extend along a second direction perpendicular to a first direction, the first direction is an extending direction of data lines on an array substrate, and the second direction is an extending direction of gate lines on the array substrate.

19. The in-cell touch display panel claimed as claim 7, further comprising an electrode protective layer disposed on the first touch driving electrodes and the second touch driving electrodes,
   wherein the electrode protective layer is produced in a same layer as a pixel electrode layer of the array substrate, and is not connected to the pixel electrode layer.

* * * * *